April 1, 1930.  A. W. CLEARY  1,752,941
LIQUID DISPENSING APPARATUS
Filed April 7, 1927
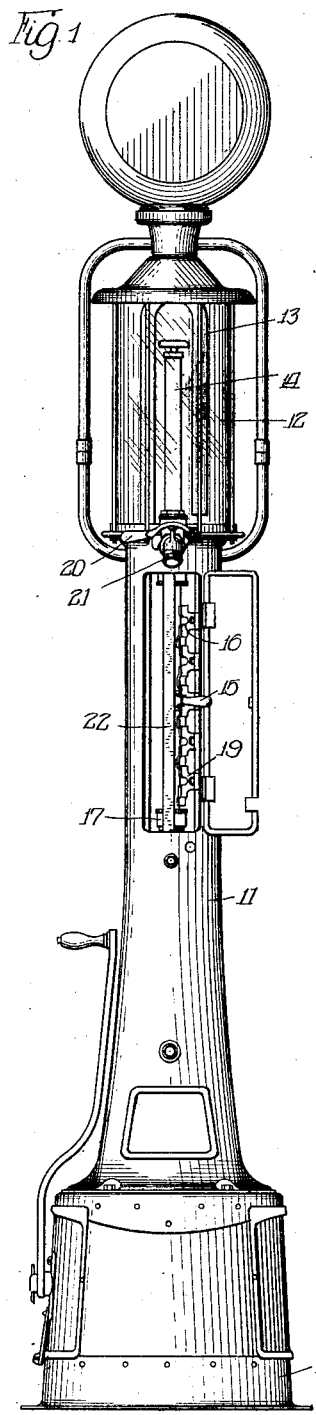
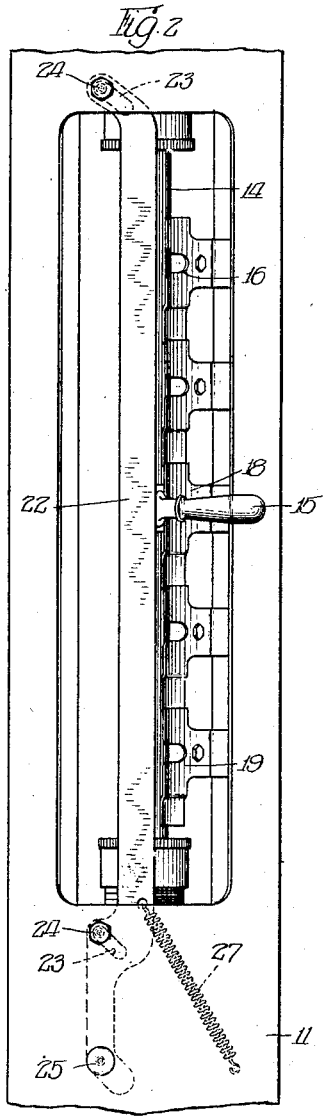
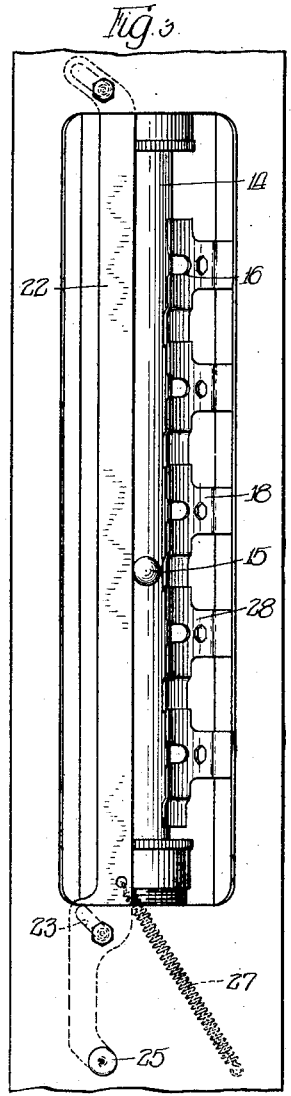
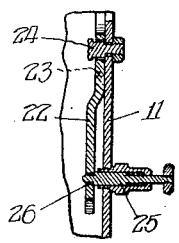
Witness:
A. Burkhardt
Inventor:
Andrew W. Cleary,
By Wilkinson, Huxley, Byron & Knight
Attys Patented Apr. 1, 1930

1,752,941

UNITED STATES PATENT OFFICE

ANDREW W. CLEARY, OF ROCHESTER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

LIQUID-DISPENSING APPARATUS

Application filed April 7, 1927. Serial No. 181,647.

This invention relates to liquid dispensing apparatus for dispensing gasoline at service stations, and relates more particularly to adjustable stop mechanism wherein a vertically adjustable liquid level controlling conduit may be adjusted and releasably locked in adjusted position.

One object of the invention is to provide a simple, reliable, efficient and accurate measuring stop mechanism whereby when the vertically adjustable liquid level controlling conduit has once been set in position, it cannot conveniently be shifted to deprive a purchaser of gasoline of full measure and especially without the inaccuracy being called to the attention of the purchaser.

Another object is to provide stop and lock mechanism for adjustable liquid level controlling means having its parts cooperating in a manner to meet all the service requirements.

These and other objects are accomplished by means of the arrangement disclosed on the accompanying sheet of drawings, in which—

Figure 1 is a front elevation of liquid dispensing apparatus embodying my invention;

Figure 2 is an enlarged detail front elevation of the stop and lock mechanism for the vertically adjustable liquid level controlling conduit, the laterally movable handle of the conduit being shown in a locked position;

Figure 3 is a similar detail sectional view showing the handle in an unlocked position and intermediate two of the stop members, the locking bar being shifted laterally into a non-locking position; and Figure 4 is a detail vertical sectional view showing a guiding means for the locking bar and also the locking means therefor.

The various novel features of the invention will be apparent from the following description and drawing and will be particularly pointed out in the appended claims.

Referring to the figures of the drawing, it will be noted that this invention is disclosed in connection with liquid dispensing apparatus including a base 10 upon which a pedestal 11 is mounted which supports preferably a transparent measuring cylinder 12 into which liquid, such as gasoline, is pumped from any suitable source and discharges into the cylinder through a supply pipe 13. A combined overflow and measuring conduit 14 extends vertically up into the measuring cylinder 12 and is movable vertically for determining the level of the liquid within the cylinder 12. Secured to the measuring conduit 14 is a laterally movable handle 15 by means of which the conduit 14 may be raised or lowered for determining the level and therefore the quantity of liquid within the measuring cylinder 12. For example, if the measuring cylinder 12 has a measuring capacity of five gallons and it is desired to measure five gallons of liquid, an upward pressure will be exerted on the handle 15 until the handle 15 comes opposite the upper stop member 16 whereupon the handle 15 will be pressed either manually into engagement with said stop member 16 or automatically thereinto, as will be explained hereinafter. At this point it may be well to note that each of the stops or measuring fingers is provided with a skirted portion (not numbered) which is adapted to span the distance between and contact with successive stops for the purpose of facilitating the sliding of handle 15 to selected measuring positions. Gasoline is then pumped into the cylinder 12 until the excess gasoline overflows through the conduit 14 and down through the return pipe 17 within which the conduit 14 telescopically slides. The measured gasoline may then be discharged through the nozzle 21 to which the usual service hose is attached. The discharge through the nozzle 21 is controlled by a gate valve having a handle 20. If a purchaser wishes to purchase three gallons of gasoline, the handle 15 will be moved into engagement with the third stop member 18, as shown, for example, in Figures 1 and 2. Likewise, if one gallon is to be dispensed, the handle 15 will be moved into engagement with the lower stop member 19, and so on for any predetermined number of gallons.

It is desirable not only to hold the handle 15 in engagement with the stop members but also to lock the handle in such engagement. Also, it is desirable to do same automatically. To accomplish this, a vertically extending laterally movable bar 22 is provided which extends adjacent the stop members. This bar is provided with preferably biased guide slots 23 which cooperate with guide screws 24 secured to the pedestal 11. As shown in Figure 2 of the drawing, the handle 15 is not only in engagement with the middle measuring stop 18 but it is held in such position by the bar 22. In addition, the bar 22 is locked in holding position by a manually operable spring pressed plunger 25, which plunger, as shown in Figure 4, is locked within a hole 26 in the lower end of the bar 22. If it is desired to release the bar 22, as for example, if it is the intention to shift the handle 15 and the conduit 14, it is first necesasry to pull the spring pressed plunger 25 outwardly whereupon the handle 15 may be moved laterally, forcing the bar 22 laterally against the tension of a spring 27, one end of which is connected to the bar 22 and the other end of which is secured to the pedestal 11. As shown in Figure 3, the handle 15 is in a position between the measuring stop 18 and the next lower measuring stop 28. Under such circumstances, the conduit 14, and accordingly the handle 15, move or tend to move downwardly by gravity. At the same time, the spring pressed bar 22 is yieldingly pressing the handle 15 toward or against the stop members so that when the handle 15 comes opposite a notch in a stop member, the handle automatically will be forced into one notch of the measuring stop for preventing further downward movement of the conduit. In moving the handle 15 into cooperative association with the stop member, the holding bar 22 is moved laterally to the extent that the hole 26 in the bar is presented to the spring pressed plunger 25 whereby the plunger enters said hole for locking the bar 22 in holding position.

It will thus be seen that the three spaced manually operable control members 15, 20 and 25 are provided in connection with the measurement and discharge of measured liquid, making it practically impossible for a single operator with his two hands to change a measuring adjustment as liquid is being dispensed without it being noticed. For example, the discharge control lever 20 must be held in an elevated position to permit the discharge of measured liquid. This lever 20 cannot be held in an elevated position and at the same time shift the conduit control handle for the reason that the spring pressed plunger 25 holds the bar 22 in locked position. In other words, the three control handles are provided and so positioned with respect to each other that it is quite impossible for a single operator to manipulate all three control members in a manner to cheat a purchaser of gasoline. The various parts are so arranged to meet the requirements of service conditions.

I claim:

1. In liquid dispensing apparatus of the class described, the combination of a vertically adjustable liquid level controlling conduit having a laterally movable handle, measuring stops adapted to be selectively engaged by said handle, and a laterally movable member mounted on said apparatus independently of said handle for holding said handle against a measuring stop.

2. In liquid dispensing apparatus of the class described, the combination of a vertically adjustable liquid level controlling conduit having a laterally movable handle, measuring stops adapted to be selectively engaged by said handle, a laterally movable member for holding said handle against a measuring stop, and means for locking said member in holding position.

3. In liquid dispensing apparatus of the class described, the combination of a vertically adjustable liquid level controlling conduit having a laterally movable handle, measuring stops adapted to be selectively engaged by said handle, and a vertically extending laterally movable bar for holding said handle against a measuring stop.

4. In liquid dispensing apparatus of the class described, the combination of a vertically adjustable liquid level controlling conduit having a laterally movable handle, measuring stops adapted to be selectively engaged by said handle, and a vertically extending laterally movable bar for holding said handle against a measuring stop, and means pressing said bar toward holding position.

5. In liquid dispensing apparatus of the class described, the combination of a vertically adjustable liquid level controlling conduit having a laterally movable handle, measuring stops adapted to be selectively engaged by said handle, a vertically extending laterally movable bar for holding said handle against a measuring stop, means pressing said bar toward holding position, and means for locking said bar in holding position.

6. In liquid dispensing apparatus of the class described, the combination of a vertically adjustable liquid level controlling conduit having a laterally movable handle, measuring stops adapted to be selectively engaged by said handle, and a spring pressed member mounted on said apparatus independently of said handle for moving said handle into engagement with one of said stop members when said handle comes opposite the latter.

7. In liquid dispensing apparatus of the class described, the combination of a vertically adjustable liquid level controlling conduit having a laterally movable handle, measuring stops adapted to be selectively engaged by said handle, and a member extending vertically adjacent said measuring stops and movable laterally for forcing said handle into engagement with any one of said stops when said handle comes opposite said stop.

8. In liquid dispensing apparatus of the class described, the combination of a vertically adjustable liquid level controlling conduit having a laterally movable handle, measuring stops adapted to be selectively engaged by said handle, a member extending vertically adjacent said measuring stops and movable laterally for forcing said handle into engagement with any one of said stops when said handle comes opposite said stop, and means for locking said member in a handle holding position.

9. In liquid dispensing apparatus of the class described, the combination of a vertically adjustable liquid level controlling conduit having a laterally movable handle, measuring stops adapted to be selectively engaged by said handle, a bar extending vertically adjacent said measuring stops and movable laterally to hold said handle in engagement with any one of said stops, and means for guiding said bar in its lateral movements.

10. In liquid dispensing apparatus of the class described, the combination of a vertically adjustable liquid level controlling conduit having a laterally movable handle, measuring stops adapted to be selectively engaged by said handle, a bar extending vertically adjacent said measuring stops and movable laterally to hold said handle in engagement with any one of said stops, means for guiding said bar in its lateral movements, and means for moving said bar toward a handle holding position.

11. In liquid dispensing apparatus of the class described, the combination of a vertically adjustable liquid level controlling conduit having a laterally movable handle, measuring stops adapted to be selectively engaged by said handle, a bar extending vertically adjacent said measuring stops and movable laterally to hold said handle in engagement with any one of said stops, means for guiding said bar in its lateral movements, means for moving said bar toward a handle holding position, and means for locking said bar in holding position.

12. In liquid dispensing apparatus, the combination of a liquid measuring device having vertically and laterally movable operating means for selectively determining the amount of liquid to be discharged, means including positive and gravitational means for urging and maintaining said operating means in selected measuring position, and means for positively locking said gravitational means in position to maintain said operating means in selected measuring position.

13. In liquid dispensing apparatus, the combination of a liquid measuring device having vertically and laterally movable operating means for selectively determining the amount of liquid to be discharged, a movable bar located in way of the lateral movement of said operating means, said bar being so disposed as to tend to move said operating means into amount selecting position.

14. In liquid dispensing apparatus, the combination of a liquid measuring device having vertically and laterally movable operating means for selectively determining the amount of liquid to be discharged, a movable bar located in way of the lateral movement of said operating means, said bar being so disposed as to tend to move said operating means into amount selecting position, and means for locking said bar to prevent unauthorized operation of said operating means.

15. In liquid dispensing apparatus, the combination of a liquid measuring device having vertically and laterally movable operating means for selectively determining the amount of liquid to be discharged, a movable bar located in way of the lateral movement of said operating means, said bar being slidably mounted to urge said operating means into amount selecting position.

16. In liquid dispensing apparatus, the combination of a liquid measuring device having vertically and laterally movable operating means for selectively determining the amount of liquid to be discharged, a movable bar located in way of the lateral movement of said operating means, said bar being slidably mounted and provided with means for urging said operating means into amount selecting position.

17. In liquid dispensing apparatus, the combination of a liquid measuring device having vertically and laterally movable operating means for selectively determining the amount of liquid to be discharged, a movable bar located in way of the lateral movement of said operating means, said bar being slidably mounted and provided with means for urging said operating means into amount selecting position, and a lock for said bar automatically locking said operating means in selected position.

18. In liquid dispensing apparatus, the combination of a liquid measuring device having means associated therewith for determining the amounts of liquid to be discharged, and means movable by said first named means for urging said first named means into amount determining position, said second named means cooperating with locking means operable to prevent movement of said second named means by said first named means.

Signed at Rochester, Pennsylvania, this 29th day of March, 1927.

ANDREW W. CLEARY.